United States Patent [19]

Zuk

[11] Patent Number: 5,627,116
[45] Date of Patent: May 6, 1997

[54] METHOD OF MAKING A TRANSLUCENT POLYCRYSTALLINE ALUMINA

[75] Inventor: Karlene J. Zuk, Hathorne, Mass.

[73] Assignee: Osram Sylvania Inc., Danvers, Mass.

[21] Appl. No.: 718,887

[22] Filed: Sep. 24, 1996

Related U.S. Application Data

[62] Division of Ser. No. 491,064, Jun. 16, 1995, Pat. No. 5,587,346.

[51] Int. Cl.$^6$ ................................................ C04B 35/115
[52] U.S. Cl. ...................... 264/1.21; 501/119; 501/127; 501/153; 501/152; 264/65; 264/66; 264/910
[58] Field of Search ................................. 501/119, 127, 501/152, 153; 264/65, 66

[56] References Cited

U.S. PATENT DOCUMENTS

| | | | |
|---|---|---|---|
| 3,026,210 | 3/1962 | Coble | 501/153 |
| 3,905,845 | 9/1975 | Kobayashi et al. | |
| 4,285,732 | 8/1981 | Charles et al. | 501/112 |
| 4,364,877 | 12/1982 | Clement et al. | 264/1.2 |
| 4,699,774 | 10/1987 | PrudHomme Van Reine et al. | 423/625 |
| 4,902,654 | 2/1990 | Aubert et al. | 501/153 |
| 5,001,093 | 3/1991 | Roy et al. | 501/153 |
| 5,244,849 | 9/1993 | Roy et al. | 501/153 |
| 5,376,606 | 12/1994 | Kim et al. | 501/153 |
| 5,382,556 | 1/1995 | Takahashi et al. | 501/153 |

FOREIGN PATENT DOCUMENTS 1511243  9/1989  U.S.S.R.

*Primary Examiner*—Karl Group
*Attorney, Agent, or Firm*—William H. McNeill

[57] ABSTRACT

A sintered, translucent ceramic article comprises alpha alumina and up to 0.050 wgt. percent magnesia and between 0.001 to 0.100 wgt. percent lutetium oxide. In a preferred embodiment, the lutetium oxide is at 0.050 wgt. percent and in a second preferred embodiment half the lutetium oxide is replaced by yttrium oxide. A method of making a translucent ceramic article comprises the steps of: forming an aqueous slurry to yield one of the composition described above; adding nitric acid to adjust the pH to 4.6; adding an aqueous binder and plasticizer in the amount of 2.5 solids wgt. percent; spray-drying the slurry; forming an article by wet-bag isopressing; prefiring said article in air at about 1325° C. for about 2 hours; and sintering said air-fired article in hydrogen for about 3 hours at 1800° C.

3 Claims, No Drawings

METHOD OF MAKING A TRANSLUCENT POLYCRYSTALLINE ALUMINA

This is a division of application Ser. No. 08/491,604, filed on Jun. 16, 1995, now U.S. Pat. No. 5,587,346.

TECHNICAL FIELD

This invention relates to translucent ceramics and more particularly to a high density polycrystalline alumina (PCA) which can be manufactured at lower sintering temperatures.

BACKGROUND ART

Translucent bodies of PCA are known. Coble, in U.S. Pat. No. 3,026,210 discloses the use of 0.0625 to 0.5 wgt. percent MgO to aid in the elimination of residual porosity by preventing the entrapment of pores inside alumina grains and to control grain growth in the late stages of sintering, when the density exceeds 98%.

Charles, et al., in U.S. Pat. No. 4,285,732, suggests the addition of small amounts of zirconia and/or hafnia to the alumina-magnesia ceramic to control the formation of a second phase, usually, spinel; i.e., magnesium aluminate, $MgAl_2O_4$, which can occur when the magnesia content increases above the solubility level. Grain sizes in the sintered bodies are said to be 20 microns to 50 microns.

DISCLOSURE OF INVENTION

It is, therefore, an object of the invention to enhance the manufacture of translucent ceramics.

It is another object of the invention to produce translucent ceramics having a small grain size with optimal density.

These objects are accomplished, in one aspect of the invention, by the provision of a composition of matter which comprises a substantial amount of alpha alumina with up to 0.050 wgt. percent magnesia and up to 0.035 wgt. percent lutetium oxide or a precursor therefor, as a grain growth inhibitor.

In another aspect of the invention, a sintered, translucent ceramic body is provided comprising a substantial amount of alpha alumina and up to 0.050 wgt. percent magnesia and between 0.001 to 0.100 wgt. percent lutetium oxide.

A method of making such a translucent ceramic article comprises the steps of: forming an aqueous slurry to yield the composition described above. To that composition is added nitric acid to adjust the pH to 4.6. An aqueous binder and plasticizer in the amount of 2.5 solids wgt. percent are then added to the slurry which is then spray-dried. An article is formed by wet-bag isopressing and the article is; prefired in air at about 1325° C. for about 2 hours; and then in hydrogen for about 3 hours at 1800° C.

BEST MODE FOR CARRYING OUT THE INVENTION

For a better understanding of the present invention, together with other and further objects, advantages and capabilities thereof, reference is made to the following disclosure and appended.

EXAMPLE 1

A batch alumina powder containing, in wgt. percent, 0.05% MgO; 0.035% $Lu_2O_3$; and 2.5% organic binder and plasticizer, such as 2.0 wgt. % polyethylene glycol and 0.5% wgt. % polyvinyl alcohol, was prepared by dispersing 500 g of 0.1 µm 65% alpha alumina at 40% solids in water in which had been added quantitatively analyzed aqueous solutions of $Mg(NO_3)_2$ and $Lu(NO_3)_3$. The lutetium nitrate was purchased form Johnson Matthey Electronics and was 99.9% pure on a metals basis. Nitric acid was added to adjust the pH to 4.6. Aqueous binder such as polyvinyl alcohol and a plasicizer such as polyethylene glycol were added in the amount of 2.5 solids wgt. percent. The slurry was stirred and then spray-dried, and the resultant power was formed into articles by wet-bag isopressing. The article was pre-fired in air for 2 hours at 1325° C., followed by sintering in hydrogen for 3 hours at 1800° C. The hydrogen firing was accomplished in two steps, viz; a first firing for 1 hour in dry hydrogen at 2 psi and a second firing at for 2 hours in hydrogen at 2 psi with a dew point of 23° C.

EXAMPLE 2

The identical procedure as Example 1 was followed except that half of the $Lu_2O_3$ (0.0175 w %) was substituted by $Y_2O_3$. Samples (2) from Examples 1 and 2 were sintered simultaneously with control samples containing a prior art composition of MgO and $Y_2O_3$. The control group had an optical in-line transmission of 5.2%, an optical overall transmission of 96%, and an average grain size of 11 microns. The articles of Example 1 had respective figures of 4.5%, 96%, and 7.8, while the articles of Example 2 had figures of 4.9%, 95%, and 9.2.

In all instances, the sintered articles produced were discharge vessels suitable for use in high pressure sodium lamps.

Thus, the composition herein described produces translucent ceramic articles having a desirably smaller grain size than compositions of the prior art.

While there have been shown an described what are at present considered the preferred embodiments of the invention, it will be apparent to those skilled in the art that various changes and modifications can be made herein without departing from the scope of the invention as defined by the appended claims.

What is claimed is:

1. A method of making a translucent ceramic article comprising the steps of: forming an aqueous slurry of a substantial amount of alpha alumina, an amount up to 0.05 wgt. percent magnesia and an amount up to about 0.035 wgt. percent lutetium oxide or a precursor therefore; adding nitric acid to adjust the pH to 4.6; adding an aqueous binder and plasticizer in the amount of 2.5 solids wgt. percent to form a slurry; spray-drying said slurry; forming an article by wet-bag isopressing; prefiring said article in air at about 1325° C. for about 2 hours; and sintering said air-fired article in hydrogen for about 3 hours at 1800° C.

2. The method of claim 1 wherein said sintering in hydrogen comprises: a first firing for 1 hour in a dry hydrogen atmosphere of 2 psi; and a second firing in hydrogen having a dew point of 23° C. for 2 hours at a pressure of 2 psi.

3. The method of claim 1 wherein 50 wgt. percent of said lutetium oxide is replaced by yttrium oxide or a precursor therefor.

* * * * *